Figure 1:
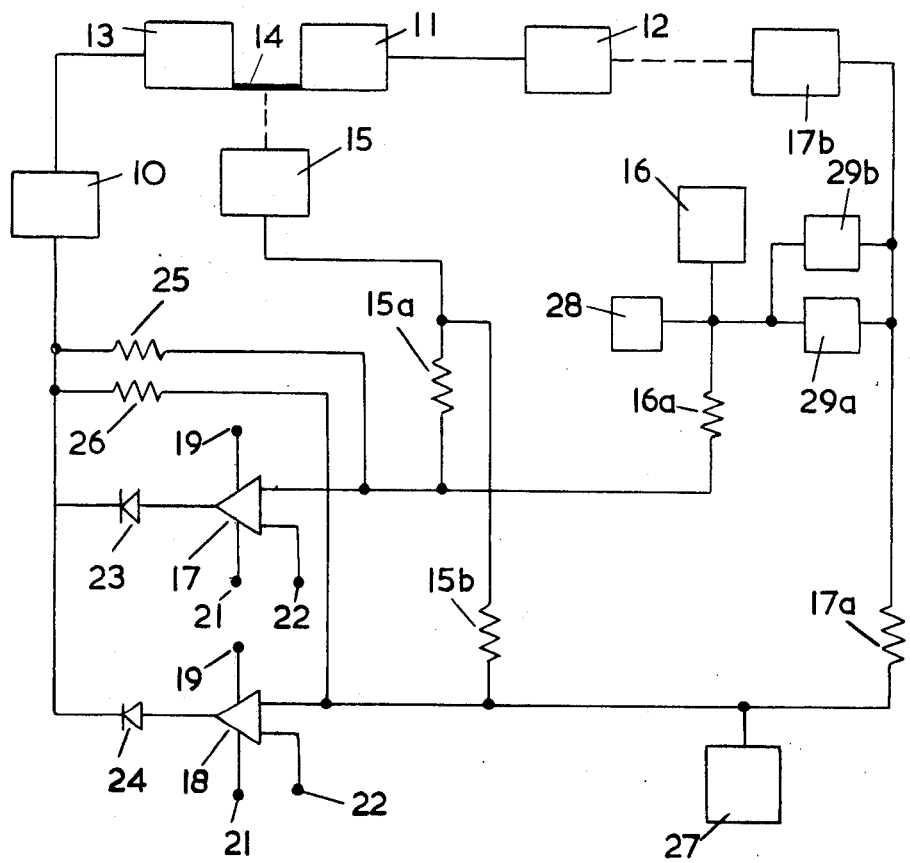

United States Patent [19]
Williams et al.

[11] 3,981,287
[45] Sept. 21, 1976

[54] FUEL SYSTEMS FOR ENGINES

[75] Inventors: Malcolm Williams, Solihull; Richard William Crookes, Shirley; Christopher Robin Jones, Alcester, all of England

[73] Assignee: C.A.V. Limited, Birmingham, England

[22] Filed: Mar. 13, 1975

[21] Appl. No.: 558,060

Related U.S. Application Data

[63] Continuation of Ser. No. 446,540, Feb. 27, 1974, abandoned.

[30] Foreign Application Priority Data

Mar. 2, 1973  United Kingdom............... 10343/73

[52] U.S. Cl......................... 123/139 E; 173/32 EA; 290/40 A
[51] Int. Cl.²..................... F02B 3/00; F02M 39/00
[58] Field of Search............. 123/139 E, 102, 32 EA; 290/40

[56] References Cited
UNITED STATES PATENTS

| | | | |
|---|---|---|---|
| 3,630,177 | 12/1971 | Engel............................. | 123/139 E |
| 3,695,935 | 10/1972 | Adler............................. | 123/139 E |
| 3,867,918 | 2/1975 | Williams et al................ | 123/139 E |

Primary Examiner—Charles J. Myhre
Assistant Examiner—Ronald B. Cox
Attorney, Agent, or Firm—Holman & Stern

[57] ABSTRACT

A fuel system for an engine has a first summing amplifier to which are fed signals representing demanded and actual values of the output of a pump supplying fuel to the engine, together with a signal representing engine speed. The summing amplifier compares the signals it receives and produces an output controlling the output of the pump, and there is also a second summing amplifier to which are fed electrical signals representing engine speed and a reference, a discriminator coupling the two summing amplifiers to a means for controlling the pump, so that the output from the discriminator at any instant is the output from the amplifier demanding the least fuel.

6 Claims, 6 Drawing Figures

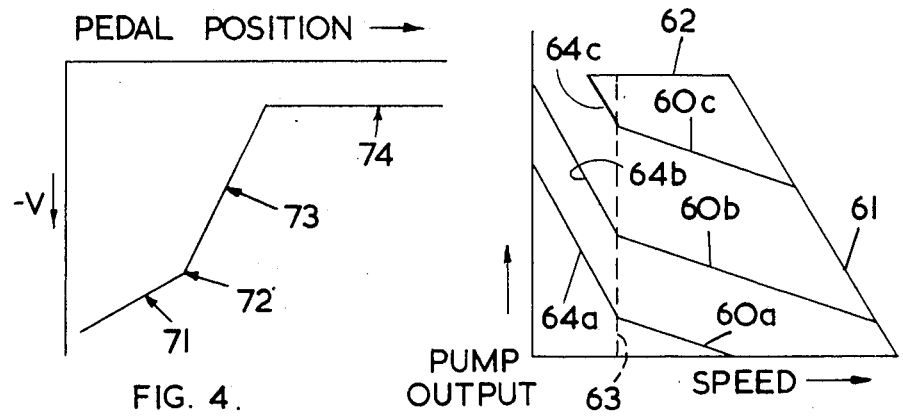
FIG. 4.
FIG. 5.
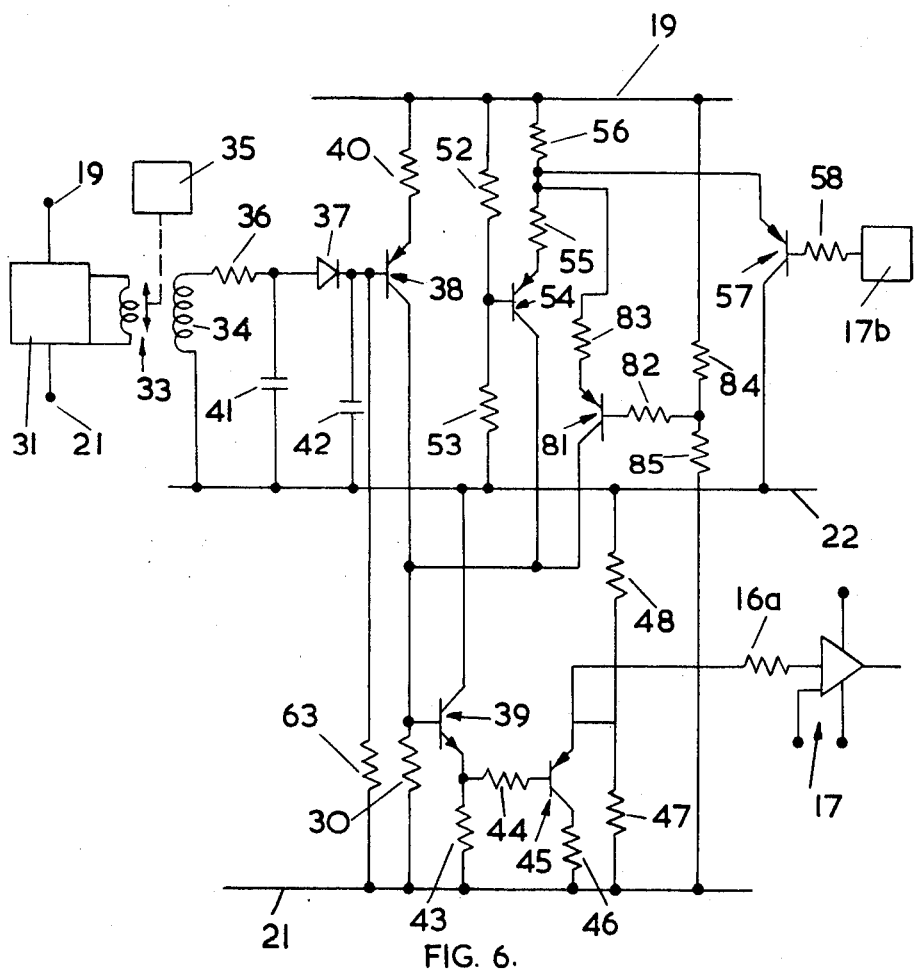
FIG. 6.

FUEL SYSTEMS FOR ENGINES

This is a continuation of application Ser. No. 446,540 filed Feb. 27, 1974, now abandoned.

This invention relates to fuel systems for engines, particularly, but not exclusively, compression-ignition engines.

A fuel system according to the invention comprises in combination a pump supplying fuel to the engine, pump control means determining the output of the pump, a first summing amplifier to which are fed signals representing the demanded and actual values of pump output, together with a signal representing engine speed, the first summing amplifier comparing the signals it receives and producing an output controlling the pump control means, a second summing amplifier to which are fed electrical signals representing engine speed and a reference, and a discriminator coupling the first and second summing amplifiers to the pump control means, the output from the discriminator at any instant being the output from the summing amplifier demanding the least fuel, so that the second summing amplifier limits the engine speed.

Preferably, the first summing amplifier limits the pump output. In this case, it is preferred that the speed signal is fed to the first amplifier indirectly by modifying the output of a transducer measuring demanded pump output.

The system may include an idle governor for modifying the pump output versus speed characteristics below a predetermined engine speed, preferably by modifying the output of the demand transducer.

Figure 2:
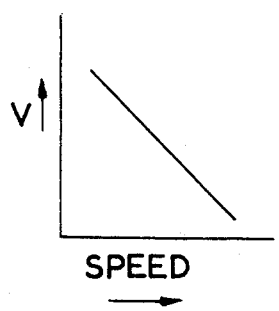
Figure 3:
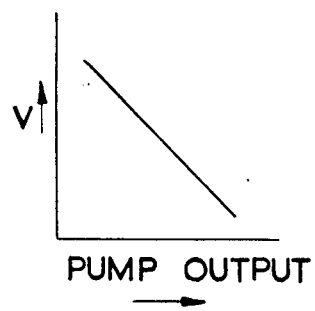

An example of the invention is illustrated in the accompanying drawings, in which FIG. 1 is a circuit diagram, partly in block form, illustrating one example of the invention, FIGS. 2, 3 and 4 are graphs illustrating the outputs of three transducers used in FIG. 1, FIG. 5 illustrates the operating characteristics of the system shown in FIG. 1, and FIG. 6 is a circuit diagram illustrating the preferred arrangement of part of FIG. 1.

Referring to the drawings, a pump 11 provides fuel to an engine 12, the output of the pump 11 being controlled by an electromechanical actuator 13 which determines the position of a control rod 14 associated with the pump 11. In the example described, the engine is a diesel engine driving a road vehicle.

The pump output is sensed by a transducer 15 which produces an output voltage of the form shown in FIG. 3. The output from the transducer 15 is fed by way of a pair of resistors 15a, 15b, respectively to the inverting input terminals of a pair of operational amplifiers 17, 18 which are connected between supply lines 19, 21. The line 19 is positive with respect to the line 21, and a third supply line 22 is provided which is at a potential mid-way between the potentials of the lines 19, 21. The inverting input terminals of the amplifiers 17, 18 are connected to the line 22.

The output terminals of the amplifiers 17, 18 are coupled through diodes 23, 24 respectively to a drive circuit 10 which provides an input to the actuator 13. Moreover, the amplifiers 17, 18 are each connected as summing amplifiers, and for this purpose have feedback resistors 25 and 26 connected between the input of the drive circuit 10 and the inverting input terminals of the amplifiers 17 and 18 respectively. By taking the feedback from the input to the drive circuit 10, the temperature characteristics of the diode 23, 24 become unimportant.

The rotational speed of the engine is sensed by a transducer 17b which produces an output of the form shown in FIG. 2. This output is fed by way of a resistor 17a to the inverting input terminal of the amplifier 18, which also receives an input from a current source 27. Moreover, the demanded pump output, which is set by the accelerator pedal of the vehicle, is sensed by a transducer 16 which provides an input by way of a resistor 16a to the inverting input terminal of the amplifier 17. A control 28 associated with the transducer 16 limits the maximum pump output by restricting the maximum demand, and FIG. 4 shows the combined output of the transducer 16 and the control 28. The output shown in FIG. 4 is modified below a predetermined engine speed by an output from an idle govenor 29a, which receives an input from the transducer 17, and by a control 29b, the governor 29a and control 29b acting in a manner to be explained.

In operation, the amplifier 17 compares the demanded fuel signal with the actual fuel signal, and produces an output by way of the diode 23 to operate the control rod 14 until the actual and demanded fuel signals are equal. Whenever the amplifier 17 is producing an output, the diode 24 is reverse biased. It will be noted that the greater the output of the amplifier 17, the smaller the pump output that is required, or in other words there is an inversion stage between the amplifier 17 and the control rod 14.

If at any time the speed of the engine reaches a predetermined value, set by the source 27, then the amplifier 18 produces an output and the diode 23 is reversed biased. The amplifier 18 now operates to maintain the speed at the predetermined value. This predetermined value is dependent upon pump output, by virtue of the input to the amplifier 18 through the resistor 15b.

At any time when the amplifier 17 is operating, then if the pump output reaches a predetermined value equal to that set by the control 28, the amplifier 17 operates to stop the pump output from rising further.

The operation of the system is best explained with reference to FIG. 5. The dotted line 63 represents a speed below which the idle governor 29a comes into operation. Above this speed, the idle governor 29a plays no part in the operation, but the control 29b is operative. The lines 60a, 60b and 60c are three of a family of lines representing different demands, and the line 60b can, for example, be regarded as the 50% demand line. For a constant demand of 50%, the pump output would be constant, that is to say the line 60b would be horizontal, were it not for the effect of the control 29b, which gives the slope indicated to the lines 60. It will be noted that some of the lines 60 cross the horizontal axis, but others intersect a line 61 which is the maximum speed curve and it is set by the amplifier 18. The line 62 shown in FIG. 5 is the maximum output line and is set by the control 28.

Below the speed indicated by the line 63, the governor 29a comes into operation and results in the production of lines 64, which are parallel to each other but have a steeper slope than the lines 60. Because the governor 29a and the control 29b both modify the output from the transducer 16, as distinct from providing a direct input to the amplifier 17, then the governor 29a and control 29b do not alter the position of the line 62. The reason for this will become more apparent with reference to the detailed arrangement shown in FIG. 6.

Referring now to FIG. 6, the circuit illustrated constitutes the transducer 16, the controls 28, 29b and the idle governor 29a. In FIG. 6, there is provided a square wave oscillator 31 connected between the lines 19, 21 and providing an output to the primary winding 32 of a transformer 33 having a secondary winding 34. The coupling between the windings 32, 34 is variable by a control member 35, which in effect is constituted by the accelerator pedal of the road vehicle. The accelerator pedal is movable progressively from a zero demand position to a maximum demand position, and varies the coupling between the windings, 32, 34 progressively, the coupling being at a maximum in the zero demand position, and that a minimum in the maximum demand position, so that the amplitude of the signal in the winding 34 decreases with increasing demand.

One end of the winding 34 is connected to the line 22, and its other end is connected through a resistor 36 and a diode 37 in series to the base of a p-n-p transistor 38 with its emitter connected to the line 19 through a resistor 40. The junction of the resistor 36 and diode 37 is connected to the line 22 through a capacitor 41, and the base of the transistor 38 is connected to the lines 22, 21 through a capacitor 42 and a resistor 63 respectively. The collector of the transistor 38 is connected through a resistor 30 to the line 21, and is also connected to the base of an n-p-n transistor 39 having its collector connected to the line 22 and its emitter connected to the line 21 through a resistor 43. The emitter of the transistor 39 is further connected through a resistor 44 to the base of a p-n-p transistor 45, the collector of which is connected through a resistor 46 to the line 21 and the emitter of which is connected to the junction of a pair of resistors 48, 47 connected between the lines 22, 21. The emitter of the transistor 45 provides the required input to the amplifier 17 by way of the resistor 16a.

There is further provided a pair of resistors 52, 53 connected between the lines 19, 22. The junction of the resistors 52, 53 is connected to the base of an p-n-p transistor 54, the collector of which is connected to the base of the transistor 39 and the emitter of which is connected through a pair of resistors 55, 56 to the line 19. The junction of the resistors 56, 55 is connected to the emitter of a p-n-p transistor 57, the collector of which is connected to the line 22, and the base of which receives an input by way of a resistor 58 from the transducer 17, this input being that shown in FIG. 1 from the output of the transducer 17 to the governor 29.

The junction of the resistors 55, 56 is also connected through a resistor 83 to the emitter of a p-n-p transistor 81. The collector of the transistor 81 is connected to the base of the transistor 39, and its base is connected through a resistor 82 to the junction of a pair of resistors 84, 85 connected between the lines 19, 21.

In order to understand the operation of the circuit, it is convenient firstly to ignore the transistors 54, 57, 81 and their associated components. As previously explained, the coupling between the windings 32, 34 is at a maximum in the zero demand position. The resistor 36 and capacitor 41 filter the signal in the winding 34, and the signal is then rectified by the diode 37 and applied to the capacitor 42 so that the capacitor 42 assumes a charge which is dependent upon the coupling between the windings 32, 34. The capacitor 42 determines the base potential of the transistor 38, and so the conduction of the transistor 38, and consequently the current flowing in the resistor 30, increases with increasing demand. As a reuslt, the transistor 39 conducts increasingly as the demand increases. The greater the conduction of the transistor 39, the smaller the current flowing through the resistor 44 to the base of the transistor 45. The arrangement is such that while the pedal is between the zero demand position and a point indicated at 72 in FIG. 4, then although the transistor 39 is conducting, sufficient current flows through the resistor 44 to saturate the transistor 45. As a reuslt, the portion 71 of the curve shown in FIG. 4 is obtained, the slope being determined by the resistors 44, 46, 47, 48 and 16a.

When the pedal reaches the point 72, there is sufficient voltage at the emitter of the transistor 39 to hold the transistor 45 in its amplifying mode. The current flowing through the resistor 48 is now determined by the resistor 16a only. This represents the portion 73 of the curve shown in FIG. 4.

When the point 74 is reached, the transistor 39 conducts sufficiently to turn the transistor 45 off. The current flowing in the resistor 16a is now determined by the resistors 47, 48 and 16a and is constant. Thus, the desired output from the transducer is obtained by using the characteristics of the transistor 45.

The control 29b is constituted by the transistors 57, 81 and their associated components. By virtue of its connection to the transducer 17b, the transistor 57 conducts increasingly as the engine speed increases. The base potential of the transistor 81 is fixed, and the various resistors are selected so that the transistor 81 conducts at all times. However, starting from a high engine speed, then as the engine speed decreases, the transistor 57 will conduct less and so the transistor 81 will conduct more. Conduction of the transistor 81 increases the current flowing through the resistor 30 beyond the level set by the accelerator pedal, and so produces the curves shown at 60a, 60b and 60c in FIG. 5.

The transistor 57 is also part of the idle governor, which includes in addition the transistor 54. The base potential of the transistor 54 is set at a level such that when the engine speed is above a value indicated by the line 63 in FIG. 5, the transistor 54 is off. However, at engine speeds below the line 63, the transistor 54 conducts and increases the current flowing through the resistor 30 further. In this way the family of curves 64 are obtained. The slope of the curve 64 is set by the resistor 55, and the slope of the curve 60 is set by the resistor 83.

Both transistors 54 and 81 operate by modifying the conduction level of the transistor 39 in a manner to simulate an increased demand. This arrangement has the great advantage that the maximum pump output is still limited as indicated by the curve 62 in FIG. 5. The transistors 54 and 81 could provide inputs to the amplifier 17 and still produce the required families of curves 60 and 64, but with such an arrangement the position of the line 62 would alter.

In a modification, the resistors 84 and 85 are selected so that the transistor 81 is cut off at a predetermined speed in excess of the speed indicated by the line 63 in FIG. 5. With this arrangement, the curve 60 would become parallel to the x-axis above this second predetermined speed.

We claim:

1. A fuel system for an engine, comprising in combination a pump supplying fuel to the engine, pump control means including a pedal for determining the output of the pump, a first summing amplifier to which are fed signals representing the demanded and actual values of pump output, said demanded value signal being proportional to the position of said pedal, together with a signal representing engine speed, the first summing amplifier comparing the signals it receives and producing an output controlling the pump control means, a second summing amplifier to which are fed electrical signals representing engine speed and a reference, and a discriminator coupling the first and second summing amplifiers to the pump control means, the output from the discriminator at any instant being the output from the summing amplifier demanding the least fuel, so that the second summing amplifier limits the engine speed, and in which the first summing amplifier limits the pump output, and in which the speed signal is fed to the first amplifier indirectly by modifying the output of a transducer measuring demanded pump output, and in which the transducer measuring demanded pump output includes an operator controlled member and associated circuit means for producing a d.c. voltage, and further including a first transistor for receiving said d.c. voltage so that the first transistor conducts increasingly with increasing demand, the first transistor being coupled to a second transistor the conduction of which decreases with increasing demand so as to provide an input to the first summing amplifier, the conduction of the second transistor being modified by said electrical signal representing engine speed.

2. A system as claimed in claim 1 in which the conduction of the first transistor is modified by said electrical signal representing engine speed.

3. A system as claimed in claim 2 including an idle governor for modifying the pump output versus speed characteristics below a predetermined engine speed.

4. A system as claimed in claim 3 in which the idle governor acts by modifying the output of a transducer measuring demanded pump output.

5. A fuel system for a compression ignition engine, comprising in combination a pump supplying fuel to the engine, pump control means including a pedal for determining the output of the pump, a first summing amplifier, first transducer means producing an output dependent on the demanded value of the pump output as indicated by the position of said pedal, second transducer means producing an output dependent on the actual value of the pump output, the first and second transducer means each providing an input to the first summing amplifier, which compares the signals it receives and produces an output controlling the pump control means, the first summing amplifier also acting to limit the pump output, a second summing amplifier, third transducer means producing an output dependent on engine speed, the output from the third transducer means being fed to the second summing amplifier together with a reference signal, a discriminator coupling the first and second summing amplifiers to the pump control means, the output from the discriminator at any instant being the output from the summing amplifier demanding the least fuel, so that the second summing amplifier limits the engine speed, a control coupled to the third transducer means and serving in accordance with the speed of the engine to modify the output of the first transducer means, and an idle governor coupled to the third transducer means and serving below a predetermined engine speed to modify the output of the first transducer means, and in which the third transducer means is coupled to a first transistor which conducts increasingly as engine speed increases, said control including a second transistor coupled to the first transistor and arranged to conduct decreasingly as engine speed increases, and said idle governor comprising a third transistor coupled to the first transistor and arranged to be non-conductive above the predetermined engine speed, but to conduct increasingly as the engine speed decreases below said predetermined speed, both the second and third transistors being coupled to the first transducer means to modify the output thereof.

6. A system as claimed in claim 5 in which each of the summing amplifiers has a resistive feedback path taken from the input to the pump control means.

* * * * *